(12) United States Patent
Han et al.

(10) Patent No.: US 11,461,029 B1
(45) Date of Patent: Oct. 4, 2022

(54) TECHNIQUES FOR STORAGE MANAGEMENT

(71) Applicant: EMC IP Holding Company LLC, Hopkinton, MA (US)

(72) Inventors: Geng Han, Beijing (CN); Ronald D. Proulx, Boxborough, MA (US); Shaoqin Gong, Beijing (CN); Baote Zhuo, Beijing (CN); Xiaobo Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 17/205,305

(22) Filed: Mar. 18, 2021

(51) Int. Cl.
*G06F 3/06* (2006.01)

(52) U.S. Cl.
CPC .......... *G06F 3/0644* (2013.01); *G06F 3/0604* (2013.01); *G06F 3/067* (2013.01); *G06F 3/0655* (2013.01)

(58) Field of Classification Search
CPC .... G06F 3/0644; G06F 3/0604; G06F 3/0655; G06F 3/067
See application file for complete search history.

(56) References Cited

U.S. PATENT DOCUMENTS

| | | | |
|---|---|---|---|
| 10,423,506 B1 * | 9/2019 | Natanzon | G06F 11/2056 |
| 10,521,145 B1 * | 12/2019 | Foley | G06F 3/0644 |
| 2019/0332296 A1 * | 10/2019 | Liu | G06F 3/0631 |
| 2021/0124506 A1 * | 4/2021 | Han | G06F 3/0608 |
| 2021/0124533 A1 * | 4/2021 | Gao | G06F 3/0659 |
| 2021/0303178 A1 * | 9/2021 | Ohira | G06F 3/0619 |

OTHER PUBLICATIONS

Dan Cummins, Dell EMC Powerstore: Dynamic Resiliency Engine (DRE), Sep. 24, 2020, available at: https://web.archive.org/web/20200924143553/https://volumes.blog/2020/08/17/dell-emc-powerstore-dynamic-resiliency-engine-dre/ (Year: 2020).*
Jian Gao, et al., U.S. Appl. No. 16/878,957, filed May 20, 2020, "Method, Device and Computer Program Product for Storage Management".

* cited by examiner

*Primary Examiner* — Ryan Bertram
(74) *Attorney, Agent, or Firm* — Muirhead and Saturnelli, LLC

(57) ABSTRACT

Techniques for storage management may include: adding first storage devices to a pool, wherein prior to adding the first storage devices to the pool, the pool includes second storage devices with existing physical storage units (PUs) distributed across the second storage devices; and in response to adding the first storage devices to the pool, performing processing to evenly distribute the existing PUs among the pool of storage devices, said processing including: defining logical pairs of storage devices in accordance with rules; binding each of the logical pairs to a resiliency set; determining that a first PU of the existing PUs includes disk slices that span across more than a single resiliency set; andin response to determining that the first PU includes disk slices that span across more than a single resiliency set, performing second processing to restripe the first PU in accordance with a target layout.

20 Claims, 9 Drawing Sheets

TECHNIQUES FOR STORAGE MANAGEMENT

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for storage management comprising: adding a first plurality of storage devices to a pool, wherein prior to adding the first plurality of storage devices to the pool, said pool includes a second plurality of storage devices with a plurality of existing physical storage units (PUs) distributed across the second plurality of storage devices; and in response to said adding the first plurality of storage devices to the pool, performing first processing to evenly distribute the plurality of existing PUs among the pool of storage devices, said first processing including: defining a plurality of logical pairs of storage devices in accordance with rules; binding each of the plurality of logical pairs to one of a plurality of resiliency sets; determining that a first PU of the plurality of existing PUs includes disk slices that span across more than a single one of the plurality of resiliency sets; and in response to determining that the first PU includes disk slices that span across more than a single one of the plurality of resiliency sets, performing second processing to restripe the first PU in accordance with a target layout.

In at least one embodiment, each of the plurality of existing PUs may include a first disk slice and a second disk slice that mirrors data of the first disk slice. The first disk slice may be included in a first storage device of the second plurality of storage devices and wherein the second disk slice may be included in a second storage device of the second plurality of storage devices. The second processing to restripe the first PU may include moving a source slice of the first PU from a source storage device of the first plurality of storage devices of the pool to a destination slice of a destination storage device of the pool. After performing the second processing, the first PU may include disk slices that are only a single one of the plurality of resiliency sets. Each logical pair of the plurality of logical pairs may include two storage devices of the pool. A first rule of the plurality of rules may specify that a first of the two storage devices of said each logical pair has a different power supply than a second of the two storage device of said each logical pair. A second rules of the plurality of rules may specify that in the target layout, the plurality of existing PUs is evenly distributed across the plurality of logical pairs of storage devices. Each storage device of the pool may be included in one of the plurality of logical pairs of storage devices.

In at least one embodiment, a write operation that writes first data to the first PU may be received and serviced while performing said second processing to restripe the first PU. The first PU may include a first disk slice of a first storage device of the pool and a second disk slice of a second storage device of the pool, wherein data of the first disk slice may mirror the second disk slice. The source storage device may be the second storage device, the source slice may be the second disk slice, and a first data slice may be stored on the first disk slice and the second disk slice. Third processing may be performed to service the write operation while also performing the second processing to restripe the first PU. The third processing may include: updating an in-memory copy of the first data slice to include the first data written by the write operation; and flushing the in-memory copy of the first data slice to the first disk slice of the first storage device, the second disk slice of the second storage device and the destination slice of the destination storage device.

In at least one embodiment, the second processing to restripe the first PU may have completed and processing may include: releasing the source slice, which is the second disk slice, for reuse; and updating metadata of the first PU to indicate that the first PU includes the first disk slice of the first storage device and the destination slice of the destination storage device. A second write operation that writes second data to the first PU may be received after the second processing has completed. Processing performed may include: updating the in-memory copy of the first data slice to include the second data written by the second write operation; and flushing the in-memory copy of the first data slice to the first disk slice of the first storage device and the destination slice of the destination storage device.

In at least one embodiment, two storage devices of the pool may go offline and the two storage devices may be included in the same one logical pair of the plurality of logical pairs. Processing performed may include: redefining the plurality of logical pairs so that each of the plurality of logical pairs includes at least one storage device of the plurality of storage devices that is online and wherein the same one logical pair is redefined to include at least one storage device of the plurality of storage devices that is online; and performing restoration processing to restore data to the redefined plurality of logical pairs.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
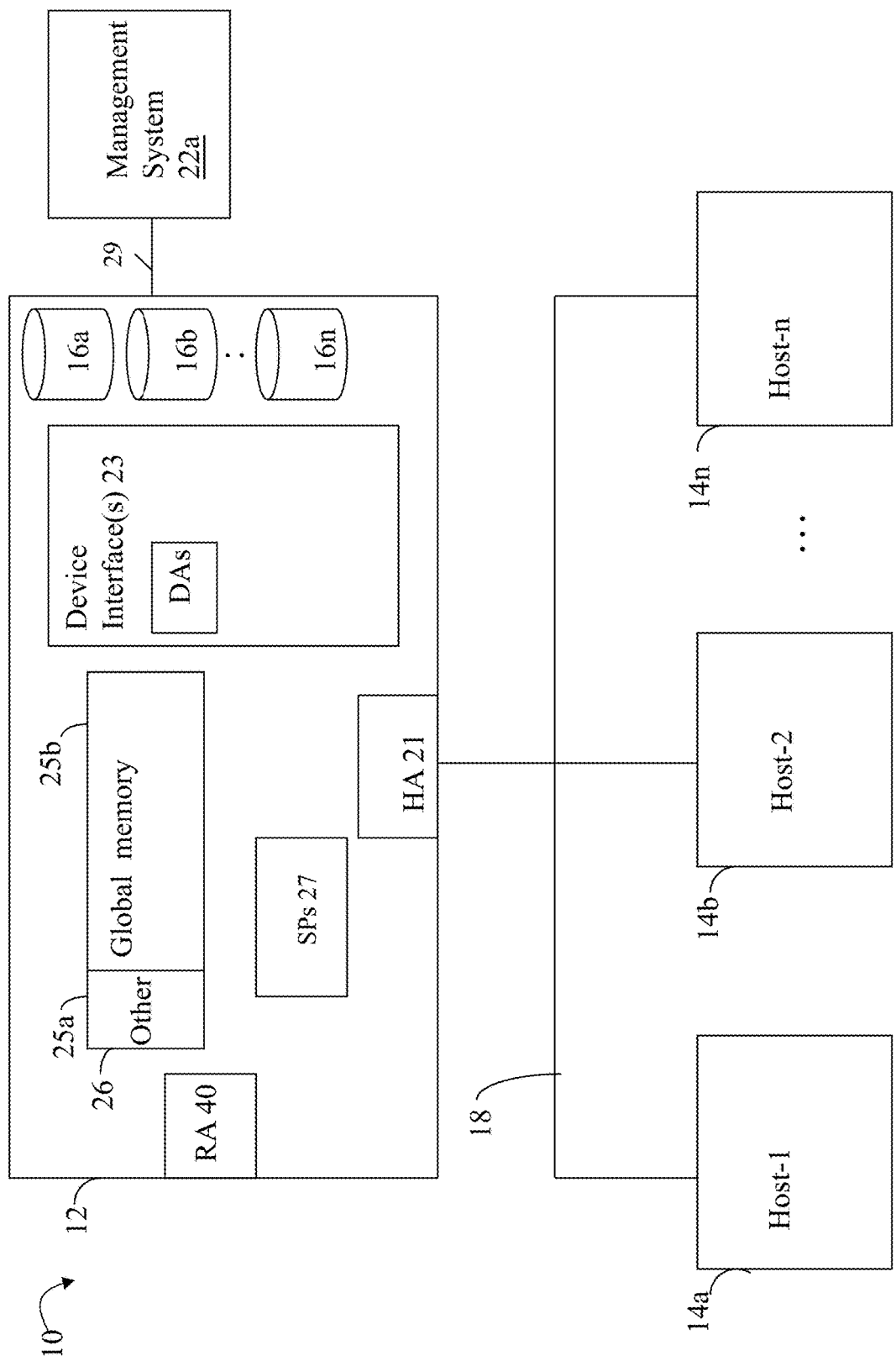
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system.

The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, groups of LUNs, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
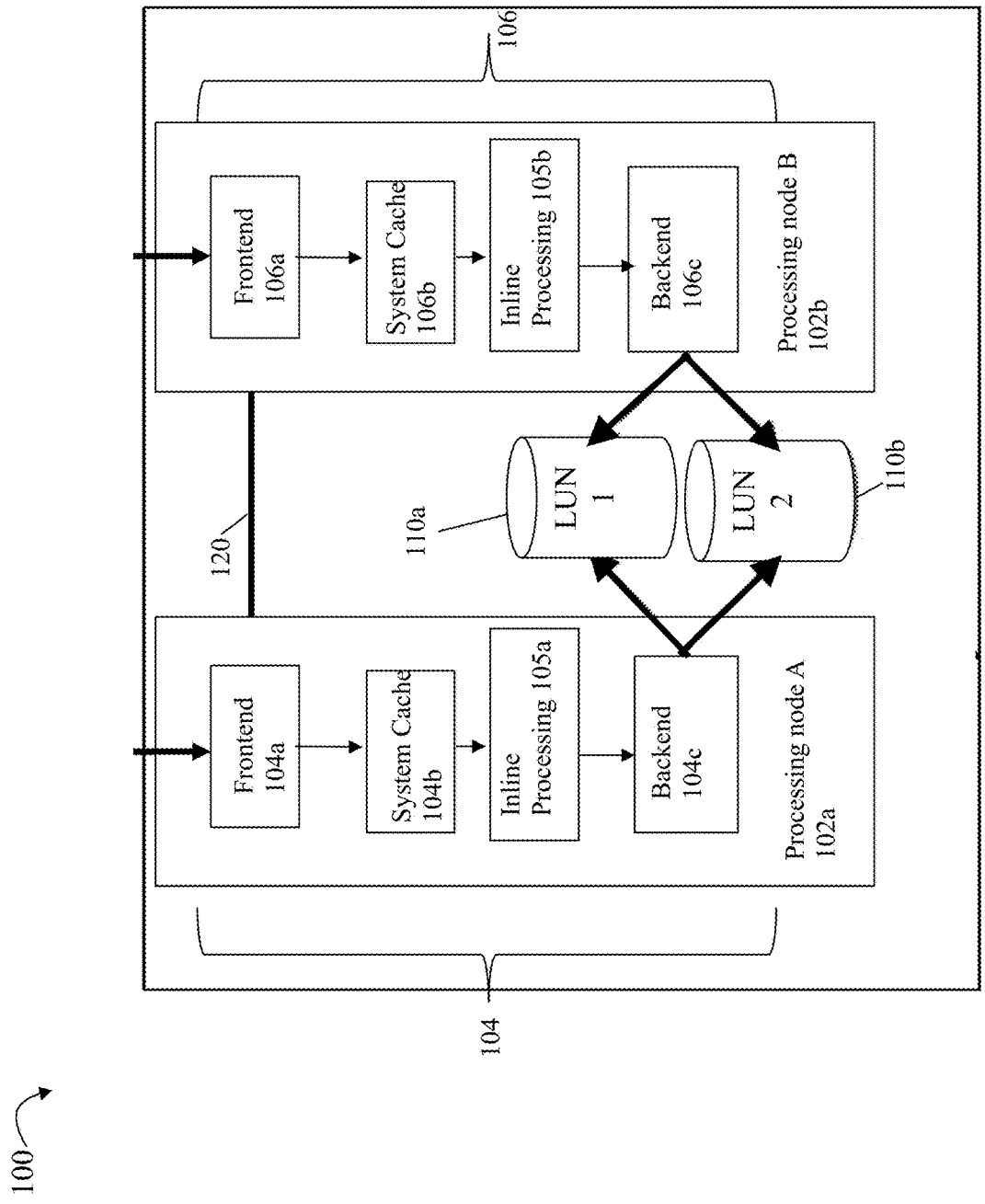
FIG. 2 is an example illustrating the PO path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache may be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs provides a persistent cache that may be referred to as a data journal, log or log tier used in the data storage system. In such a system, the caching devices or PDs are non-volatile log devices or PDs upon which the log is persistently stored. In at least one embodiment, in addition to such a persistently stored log, one or more of the nodes may also include node-local in-memory copies of information of the log.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log tier may be used to optimize write operation latency. Generally, the write operation writing data is received by the data storage system from a host or other client. The data storage system then performs processing to persistently record the write operation in the log. Once the write operation is persistently recorded in the log, the data storage system may send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed may now be reclaimed for reuse. The write operation may be recorded in the log in any suitable manner and may include, for example, recording a logical address to which the write operation is directed and recording the data written by the write operation.

In at least one existing system, a hardware upgrade may be performed to expand the number of PDs of the log tier used for storing the log. For example, an existing system may include an original pair of NVRAM drives used for storing recorded data of the log. The log tier may be upgraded by installing additional NVRAM drives used for the log. For example, the log tier may be upgraded by installing an additional pair of NVRAM drives so that the log tier now includes a total of 4 NVRAM drives.

Described in the following paragraphs are techniques that may be used to facilitate the foregoing hardware upgrade in which additional or new PDs are added to the log tier. In at least one embodiment, in order to use all 4 PDs of the log tier, the existing organization and logical structure or layout for storing data on the original pair of PDs may be expanded across all 4 PDs of the log tier. Existing physical storage units or ubers (PUs) configured on the original pair of PDs may be distributed as evenly as possible among both the original pair of PDs and also the newly added pair of PDs. Such distribution may include restriping a PU at desired target locations on the newly added pairs. Restriping may include migrating at least one slice of existing data of the PU from a source location on a PD of the original pair to a target location on a PD of the newly added pair. The new pair of PDs added may be configured into PUs so that the total available log space of the log tier may be expanded to utilize all 4 PDs of the log tier. The techniques may be used to provide a data in place hardware upgrade of the log tier without disrupting I/O service.

In at least one embodiment, logical pairs may be bound to the PDs of the log tier. In response to adding another pair of PDs by inserting the pair of PDs into drive slots while the system is online, running and servicing I/Os, processing may be performed to reorganize all the PDs of the log tier into different resiliency sets (RSs). Processing may include rebinding logical pair identifiers (IDs) to all PDs of the log tier and then partitioning the PDs of the log tier into different RSs in accordance with assigned logical pair IDs. After forming the RSs, the existing PUs may cross or include slices from more than one RS and trigger restriping of such PUs. The restriping is performed in accordance with the RSs and logical pairs, where the restriping balances or redistributes the PUs across all the PDs of the log tier including the newly added pair of PDs.

The foregoing and other aspects of the techniques herein are described in more detail in the following paragraphs.

The techniques described in the following paragraphs may be used in connection with the log tier of NVRAM devices as mentioned above. More generally, the techniques herein may be used in connection with multiple non-volatile PDs for any suitable purpose. Generally, the techniques herein may be used with a set of non-volatile PDs forming a storage resource pool (sometimes referred to as storage pool or pool). In some embodiments, each PD of the storage resource pool may be divided into slices. For example, in at least one embodiment, each of the non-volatile PDs of the pool may be divided into fixed size slice, where each slice is 4 GB (gigabytes).

The following paragraphs provide examples using the techniques herein such as where the log tier is expanded or upgraded by adding a pair of PDs. More generally, the techniques herein may be used with a log tier or group of existing PDs that is expanded by adding any number of pairs of PDs subject to any suitable maximum that may vary with embodiment.

A PU may generally be defined as a set of slices of multiple PDs where data is stored in the PU according to a particular algorithm or configuration. In this manner, data may be read from and written to the PU using a particular algorithm to provide for data protection and/or redundancy.

For example, in at least one embodiment as described herein, each PU may be configured using data mirroring where each PU may be composed of two slices from two different PDs and the data in the two slices are mirror images of each other. Each PU may be configured using multiple PDs where a single PU includes one or more slices (M slices) from each of the multiple PDs. In one embodiment, M may be an integer that is greater than or equal to 1. As another example, in at least one embodiment, each PU may be configured from a set of slices in accordance with a 4+1 RAID-5 configuration (e.g., 4 drives storing user data with I drive storing parity information), where each PU provides 64 GB of space for storing user data based on a 4 GB slice size and 4 slices on each of the 4 PDs or drives storing user data.

Figure 3:
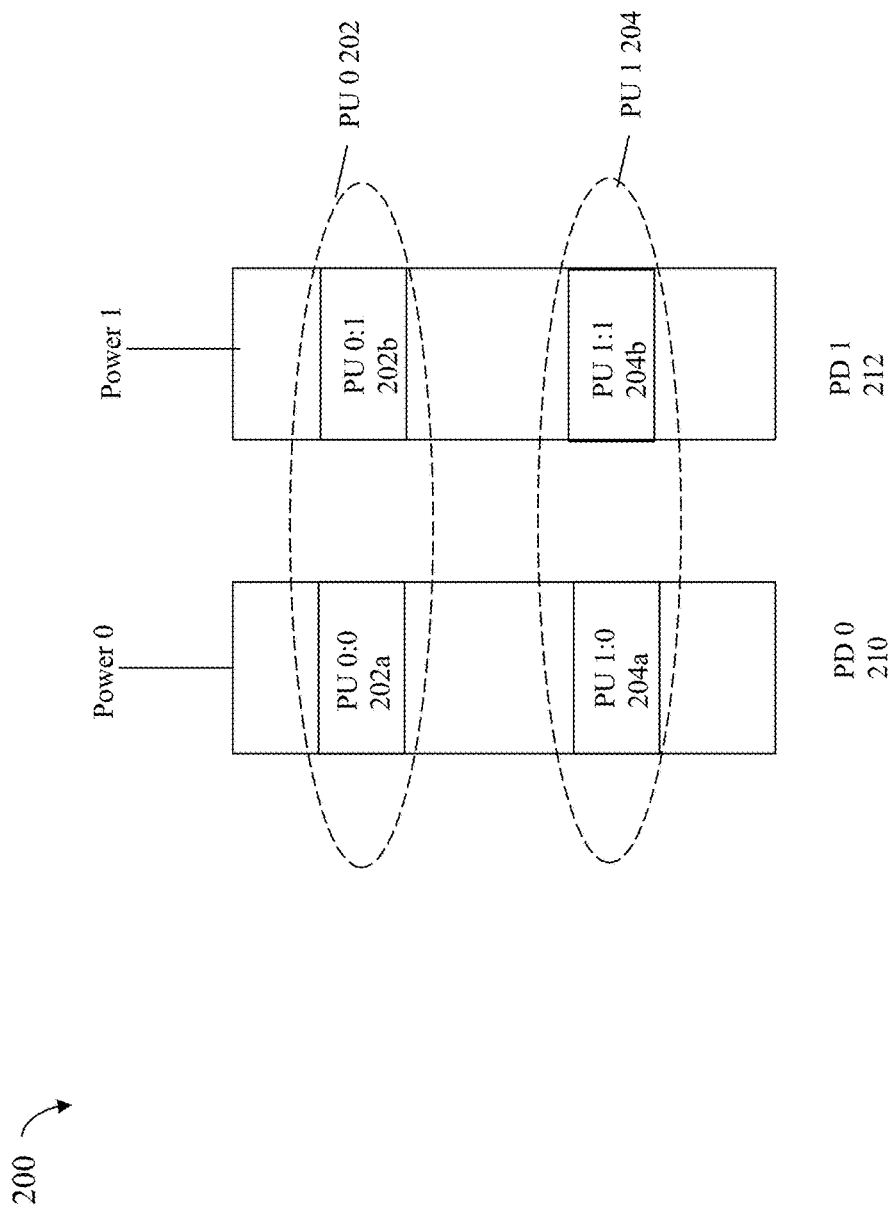
FIGS. 3 and 4 are examples illustrating physical ubers or storage units (PUs) in an embodiment in accordance with the techniques herein.

With reference to FIG. 3, shown is an example 200 illustrating a log tier including two PDs configured into PUs. The two PDs of the example 200 may be two PDs of the original pair of PDs in the log tier prior to upgrading to add additional PDs to the log tier. In one embodiment, a PU may be configured using the two PDs 210, 212 and include a slice from each of the two PDs 210, 212. A single PU may be a stripe across the pair of PDs, PD0 210 and PD1 212, where a first slice of the PU on PD0 is a data mirror of a second slice of the PU on PD1. In this manner, each PU may be configured from a pair of PDs including data slices mirrored on the pair of PDs. For example, the PU 0 202 includes the slice 202a, denoted as PU0:0, and the slice 202b, denoted as PU0:1, where the slices 202a and 202b are data mirrors of one another. The PU 1 204 includes the slice 204a, denoted as PU1:0, and the slice 204b, denoted as PU1:1, where the slices 204a and 204b are data mirrors of one another. Thus, each PU may be configured from mirrored slices on the 2 PDs 210, 212 to provide for data redundancy across the 2 PDs 210, 212.

Subsequently, a hardware upgrade may be performed to the log tier by adding additional PDs to the log tier. For example, with reference to FIG. 4, assume the hardware upgrade adds an additional pair of PDs to the log tier. In the example 300, the element 302 shows the log tier including the original PD pair as in FIG. 3. In the original configuration 302 prior to the upgrade, the PD 0 210 is powered by the power supply 0 (power 0) and the PD 1 212 is powered by a different power supply, the power supply 1 (power 1).

In at least one embodiment in accordance with the techniques herein, the log tier arrangement of 302 may be upgraded 303 to the arrangement of 4 PDs as denoted by the element 304. The log tier 304 after the upgrade includes the original pair of PDs 210, 212 and an additional pair of PDs 310, 312. In the upgraded configuration 304, the PD 0 210 and the PD 2 310 are powered by the power supply 0 (power 0); and the PD 1 212 and the PD 3 312 are powered by the power supply 1 (power 1). In at least one embodiment, the additional pair of PDs 310, 312 may be added while the system is online, running and servicing I/Os. In response to adding the new PDs 310, 312 to the log tier, processing may be performed to redistribute as evenly as possible the existing PUs currently configured on the original PDs 210, 212 across all 4 PDs 210, 212, 310, 312. Subsequently, the log space of the log tier may be expanded across all 4 PDs. In particular, the log space of the log tier is expanded to include any available or unused storage of the 4 PDs after the existing PUs are redistributed across all 4 PDs.

In the example 300 for the upgraded configuration 304, processing is performed to redistribute the existing PUs—PU0 and PU1—among the 4 PDs—PD 0 210, PD1 212, PD2

310, and PD3 312. Generally, there are 2 options to equally redistribute the existing PUs (e.g., PU0 and PU1) among the 4 PDs:

Option 1: move the PU1:0 (204a) from the PD 0 (210) to the PD 2 (310), and move the PU1:1 (204b) from the PD 1 (212) to the PD 3 (312); or Option 2: move the PU0:1 (202b) from the PD 1 (212) to the PD 3(312), and move the PU1:0 (204a) from the PD 0 (210) to the PD 2 (310).

Both options above guarantee that each PU is configured from two PDs, where each of the two PDs is powered using a different power supply. In at least one embodiment, the foregoing of having each PU configured from slices of two PDs that use different power supplies may be a configuration requirement or rule in connection with redistributing and reconfiguring the existing PUs among the 4 PDs. Having each PU so configured provides for availability of data of the PU even if one of the power supplies fails.

In at least one embodiment, option 2 may be selected over option 1 since in option 2, each PU has only 1 drive slice to be restriped, copied or migrated. In contrast, option 1 has two slices of the single PU 1 to be restriped, copies or migrated. There may be advantages in some embodiments of having to only restripe, copy or migrate no more than a single drive slice of each PU as in option 2. Additionally, there may be restrictions or limitations in some embodiments of having to restripe, copy or migrate two slices of the same PU as in option 1. For example, an embodiment may not be able to restripe, copy or migrate multiple slices of the same PU in parallel or in a same operation or cycle but may be able to restripe, copy or migrate multiple slices of two different PUs in fewer cycles or operations. Thus in some embodiments option 2 may be more efficient. Although some data movement options and alternatives may be more efficient than others, an embodiment in accordance with the techniques herein may generally perform any suitable movement or migration of slices in connection with redistributing the existing PUs among the expanded set of PDs in the upgraded configuration 304, where such movement or migration is in accordance with the configuration rules or requirements as described herein. As noted above and elsewhere herein, one configuration requirement or rule is that each PU is configured from slices of two PDs where each of the two PDs use different power supplies. Another configuration rule or requirement also discussed elsewhere herein is that the PDs in the upgraded configuration are partitioned into one or more logical pairs of PDs where, after redistribution and any necessary data slice movements are completed, each PU includes slices from only a single one of the logical pairs all configured logical pairs. Yet another configuration rule or requirement also discussed elsewhere herein is that the redistribution of the existing PUs among the PDs of the upgraded configuration 304 should distribute the existing PUs as evenly as possible among all the PDs of the upgraded configuration.

In any case, in at least one embodiment in accordance with the techniques herein, redistributing the existing PUs may include selecting and implementing option 2 noted above. In connection with implementing option 2, reference is made to the element 304 of FIG. 4 where the arrow 322 illustrates migrating the PU0:1 (202b) from the PD 1 (212) to the PD 3(312); and the arrow 324 illustrates migrating the PU1:0 (204a) from the PD 0 (210) to the PD 2 (310).

It should be noted that other existing PUs configured from slices of the PD0 210 and the PD1 212 may be similarly redistributed among the 4 PDs in a manner similar to the PU0 and the PU1 as discussed and illustrated in connection with FIG. 4. For example, assume there are equal numbers of odd numbered PUs and even numbered PUs. In this case, any remaining existing even numbered PUs may have a first slice stored on PD 0 and a second slice stored on the PD 3 in a manner similar to the PU 0, where the first and second slices of the even numbered PU are data mirrors; and any remaining existing odd numbered PUs may have a first slice stored on the PD 1 and second slice stored on the PD 2 in a manner similar to the PU1, where the first and second slices of the odd numbered PU are data mirrors.

Generally, a virtual uber or storage unit (VU) may be mapped to one or more PUs. For example, in at least one embodiment having 4 PDs (e.g., PDs 0-3) as in 304, a VU may be mapped to two PUs where each PU is configured on a different pair of PDs. A VU may include a single stripe of the two PUs.

With reference to the configuration 304 after implementing option 2 to redistribute the existing PUs PU0 and PU1, a stripe across all 4 PDs (PDs 0-3) may be configured to include the one existing PU and another available or free PU. Thus, after redistribution or restriping is completed by implementing option 2, a first stripe or VU may include the existing PU 0 and a first free or available PU. PU0 may be configured with a disk slice 0 (e.g., PU 0:0) from the PD 0 210 and a disk slice 1 (e.g., PU 0:1) from the PD3 312, where the disk slices 0 and 1 of the PU0 contain identical or mirrored data. The first free of available PU may be configured from a disk slice from the PD 1 that is mirrored on another disk slice from the PD 2. Additionally, after redistribution or restriping is completed by implementing option 2, a second stripe or VU may include the existing PU 1 and a second free or available PU. The PU1 includes a disk slice 0 (e.g., PU 1:0) from the PD2 310 and a disk slice 1 (e.g., PU 1:1) from the PD 1 212, where the disk slices 0 and 1 of the PU1 contain identical or mirrored data. The second free of available PU may be configured from a disk slice from the PD 0 that is mirrored on another disk slice from the PD 3.

As another example, there may be a set of 8 PDs in the log tier so that a stripe across all 8 PDs may be configured to include 4 PUs, where each PU is configured on a different pair of PDs. In this case, a VU may include 4 PUs forming the same single stripe. More generally, in at least one embodiment a VU may correspond to a stripe of PUs across a set of PDs. In this manner, a VU's size and number of PUs included in a single VU may vary with embodiment and the number of PDs used to configure PUs.

A virtual container (VC) may be defined as a group of PUs that provide storage for one or more VUs. Consistent with discussion elsewhere herein, each of the VUs of the VC may be mapped to a number of PUs of the VC. VUs may be exported from the VCs for any suitable use such as, for example, storing data of logged write operations.

In some embodiments, each VU may be mapped to a logical address space used by an application or other module. For example, based on a logical address, the application or other module may perform a data access, such as a read or a write operation, where the logical address is then mapped to a particular VU and a first location or first offset in the particular VU. Further, the particular VU and first location or first offset in the VU may be further mapped to a particular PU and second location or second offset in the particular PU. In this manner, for example, an existing record of the log that includes data stored at a logical address may be updated as needed by issuing a write to the logical address of the log that is mapped to a corresponding PU and offset in the PU. Additional information regarding PUs, VUs and use thereof in at least one embodiment is described, for example, in U.S. patent application Ser. No. 16/878,957, filed on May 20, 2020, entitled METHOD, DEVICE AND COMPUTER PROGRAM PRODUCT FOR STORAGE MANAGEMENT, to Gao et al., which is incorporated by reference herein in its entirety.

What will now be described is how the PU restriping, re-layout or redistribution of option 2 noted above may be triggered in an embodiment in accordance with the techniques herein. In at least one embodiment, the data storage system may maintain physical pairs or platform pairs, where each platform pair includes a pair of PDs of the log tier. The particular PDs included in each platform pair may be fixed and bound to particular drive slots. For example, in at least one embodiment, drive slots 23 and 24 may be bound to platform pair 0, and drive slots 21 and 22 may be bound to platform pair 1. In this manner, the particular slot into which a PD of the log tier is inserted determines the particular platform pair that includes the PD. For example, with reference to FIG. 4, the original pair of PDs 210, 212 may be included in the platform pair 0; and the added pair of PDs 310, 312 may be included in the platform pair 1.

A resiliency set (RS) may be defined as a logical grouping of PDs forming a protection domain. In at least one embodiment as illustrated in the upgraded configuration 304, a RS may include the pair of PDs from which mirrored slices are included for a PU or set of PUs. In such an embodiment, the configuration requirements or rules may require that all slices for a single PU come from the same RS, and that slice distribution among all PDs should be as even as possible. Volume data stripes are written fully consistent within a RS and distributed across the PDs of the RS. Generally, data of a single failed PD in a RS may be recovered or rebuilt using data from one or more other healthy functioning PDs of the same RS. In at least one embodiment, the RS may include the PDs used for storing user data in accordance with a specified algorithm and configuration providing data protection and redundancy. For example, as discussed below in more detail for the upgraded configuration 304, each RS may be configured from a different logical pair of PDs. For a given logical pair of PDs (PD A, PD B), a PU may be configured to have a first slice of data on PD A and a second slice of data on PD B where the first and second slices of data are mirrors of one another. In this case, if a first PD of the logical pair fails, the data of the first PD may be recovered or rebuilt by copying the mirrored corresponding slice from the remaining second PD of the same logical pair. Having multiple failure domains or RSs increases the reliability of the system since it allows the appliance to tolerate a drive failure within each of these RSs if the failure occurs at the same time.

In the original configuration of 302 prior to the upgrade, the platform pair may denote the PDs included in a RS. After performing the upgrade 303 to the configuration 304, multiple RSs may be formed based on logical pairs of PDs of the configuration 304. In particular, there may be a one-to-one mapping between each logical pair of PDs and each RS. The logical pairs of PDs may be formed in accordance with specified logical pair rules or requirements described elsewhere herein. In the upgraded configuration 304, a first logical pair of PDs may include the PD 0 and the PD 3 where slices from the first logical pair of PDs are included in PU0; and a second logical pair of PDs may include the PD1 and the PD2 where slices from the second logical pair of PDs are included in PU1. Thus logical pairs of PDs in the upgraded configuration 304 may be defined in accordance with the redistribution of PUs and their slices among the 4 PDs. A first RS having a RS identifier (ID)=1 may be mapped to the first logical pair of PDs, PD 0 210 and PD 3 312. Additionally, a second RS having a RS ID=2 may be mapped to the second logical pair of PDs, PD 1 212 and PD 2 310. The foregoing logical pairs of PDs are determined based on the desired target layout or resulting redistribution of PUs in the upgraded configuration 304. Forming RSs based on the foregoing logical pairs of PDs triggers any needed restriping, migration and copying of data for PUs that include slices from more than one RS. Consistent with other discussion herein in at least one embodiment, a PU may be required to have all of its slices come from the same single RS. For example, redistribution processing may determine that PU0 in the final target layout of the configuration 304 after restriping should have one slice on PD 0 and another slice on PD3, and that PU1 in the final target layout of the configuration 304 after restriping should have one slice on PD1 and another slice on PD2. The foregoing may describe the target layout of configuration desired as illustrated by 304 after restriping or redistribution of the existing PUs—PU0 and PU1—is performed. In order to achieve this target layout, the option 2 described above may be triggered and implemented as part of restriping due to the violation of the configuration rule or requirement that a PU have all of its slices come from the same single RS.

In this manner, an embodiment in accordance with the techniques herein may define logical pairs of PDs in the updated configuration based on the target layout, and assign each logical pair of PDs to a different RS. The logical pairs and thus the RSs may be defined for the upgraded configuration 304. Subsequently, any existing PUs having slices in more than one RS may then trigger restriping of such PUs, where restriping performs any needed slice migrations or copying so that each of the PUs has slices in only one RS. The restriping may be accomplished by migrating or copying data slices of one or more PUs among the PDs such as described by option 2 above. For example, let RS1=(PD 0, PD 3) and RS2=(PD1, PD2). A determination is then made during processing that a current configuration of the PU 0 (having slice 202a on PD0 and slice 202b PD1) violates the configuration rule or requirement that all slices of PU0 be in the same RS (e.g., either all slices of PU0 on the PDs of RS1 or all slices of the PU0 on the PDs of RS2). The foregoing violation for PU 0 may be corrected by implementing option 2 described above where the slice 202b is moved (322) from the PD 1 to the PD3. As a result after implementing option 2, the PU0 now has all its slices included in the same RS1. A determination is also made during processing that a current configuration of the PU 1 (having slice 204a on PD0 and slice 204b PD1) violates the configuration rule or requirement that all slices of PU1 be in the same RS. The foregoing violation for PU 1 may be corrected by implementing option 2 described above where the slice 204a is moved (324) from the PD 0 to the PD2. As a result after implementing option 2, PU1 now has all its slices included in the same RS2.

In at least one embodiment in accordance with the techniques herein, when the number of PDs in the log tier changes by adding an additional pair of PDs to achieve the upgraded configuration 304, processing may be performed to reorganize the PDs of the log tier into different RSs based on the logical pairs of PDs as discussed above and also in the following paragraphs.

What will now be described in more detail are logical pair rules or requirements that may be followed when determining what pair of PDs of the log tier to include in a particular logical pair. In at least one embodiment, a logical pair ID may be assigned to each PD of the log tier. The logical pair ID may be persistently stored as device metadata in a database or data store used by the system. The logical pairs of PDs and the logical pair IDs assigned to the PDs of the log tier are configurable and may be updated. In at least one embodiment, the following logical pair rules or requirements may be used to initialize and update the logical pair ID assigned to each PD of the log tier:

Logical pair rule 1 (in certain contexts may sometimes referred to as rule 1). When initially configuring the storage system, the logical pair ID of each PD of the log tier may be initialized to be the same as the platform pair ID for the PD. For example, the element 302 may denote the two PDs of the log tier when the system is initially configured where each of the two PDs 210, 212 is assigned a logical pair ID equal to that of the platform pair ID. In this example 302, the single platform pair ID=0 and thus single logical pair 0 includes the PDs (PD0, PD1).

Logical pair rule 2 (in certain contexts may sometimes referred to as rule 2). After additional PDs are added to the log tier, logical pairs may be determined using all the PDs of the log tier where:
 a) each logical pair includes two PDs with different power supplies; and
 b) in the target layout after the distribution of the existing PUs among both the existing and additional PDs of the log tier is complete, the existing PUs should be distributed as evenly as possible among the configured logical pairs of PDs (e.g., balanced space utilization among the logical pairs of PDs).

Logical pair rule 3 (in certain contexts may sometimes referred to as rule 3). After rebooting the data storage system, logical pairs are determined by the configurations of existing PUs. For example, prior to the reboot, PU 0 may include slices from PD 0 210 and PD 3 312 (e.g., logical pair includes PD0, PD3); and PU1 may include slices from PD 1 212 and PD 2 310 (e.g., logical pair includes PD1, PD2). After the system is rebooted, the logical pairs are determined based on the layout or configuration of the PUs as immediately prior to the reboot. In this example, the logical pairs of PDs may be determined in accordance with the particular pair of PDs including slices for the PU0 and the PU1.

The logical pair rule 1 above may be used to determine logical pairs and assign logical pair IDs to the PDs of the log tier when initially configuring the storage system. The logical pair rule 2 above may be used to determine logical pairs and assign logical pair IDs to the PDs of the log tier in response to adding PDs to the log tier such as, for example, described herein in connection with FIG. 4. In connection with the logical pair rule 2b), the code performing the processing to assign and determine logical pairs may know the target layout of how the data will subsequently be striped, moved or migrated based on the logical pairs determined. In this manner, implementation of the target layout based on the determined logical pairs is expected to distribute, as evenly as possible, the existing PUs among the logical pairs formed from both the existing and newly added PDs of the log tier.

After the one or more logical pairs are determined and logical pair IDs assigned to the PDs of the log tier, a different RS is mapped, assigned or bound to each of the logical pairs. Subsequent to mapping logical pairs to RSs, processing may be performed to determine whether any one or more existing PUs cross two RSs where the PU is configured from slices of PDs from more than one RS. If so, restriping is performed for those PUs configured from slices of PDs from more than one RS. After restriping has completed, all PUs are configured from slices of PDs of only the same RS. Consistent with other discussion herein, the restriping may include moving or migrating slices of a PU between PDs such as described herein in connection with FIG. 4 so that the PU may meet the configuration rule or requirement where the PU is only configured from slices of PDs of a single RS. Additional details regarding processing that may be performed in connection with restriping or re-laying out the PUs based on the desired target configuration or layout are described in the following paragraphs.

In the following paragraphs, processing in connection with restriping may be described with respect to communications and tasks performed by a RAID or drive management component (DMC) which performs drive management processing; and a logger component which performs processing in connection with the log tier. However, more generally, the processing may be performed by any one or more suitable components that may vary with embodiment.

In at least one embodiment, an in-memory copy of the log or log tier may be maintained. The in-memory copy of the log may be stored in volatile memory, for example, of one or both of the nodes of the system. In such an embodiment, the in-memory copy of the log may include only a single copy of each slice of the log. In contrast, the log as stored on the non-volatile PDs of the log tier may redundantly store each slice of the log. The processing described in the following paragraphs for restriping provides for re-laying out the PUs based on a desired target configuration. In at least one embodiment, the restriping may be performed as a background task or operation while also allowing writes to the same PUs for which restriping may or may not have commenced and where such restriping may or may not be in-progress. The following paragraphs describe restriping of PUs where writes may be processed prior to completing the restriping for the PUs. Additionally, the following paragraphs describe restriping techniques which provide for maintaining redundant data and preserving both the prior PU layout along with the new PU layout in case a failure occurs prior to completing the restriping of the new layout. In case such a failure occurs prior to completing the restriping of the new layout, processing may be performed to revert to the old prior layout.

In a step S1, processing may be performed to identify PU candidates with slices from more than one RS. After additional PDs are added to the log tier, processing as discussed above may be performed by the DMC to determine the logical pairs of PDs and bind each logical pair with a different RS ID. Additionally, the DMC may perform processing in the step S1 to determine which of the existing PUs are candidates for restriping. Consistent with other discussion herein, a PU is a candidate for restriping if the PU includes slices from different RSs (e.g., since the foregoing violates a configuration rule or requirement as described elsewhere herein). In at least one embodiment, subsequent processing described below for a PU candidate is performed to move a slice of the PU among PDs so that after the slice movement, the PU only includes slices from a single RS. More generally, the subsequent processing for a PU candidate may be performed to move one or more slices of the PU among PDs so that the PU only includes slices from a single RS.

Following the step S1, a step S2 may be performed to allocate destination slices for the data movements for the restriping in accordance with the target configuration or layout. For each of the PU candidates identified, a data movement or migration of a slice is determined to move the slice from a source to a destination. The data movement is determined in accordance with an RS associated with the PU candidate in the desired target layout or configuration that will result after the movement is performed. In at least one embodiment, the DMC may allocate in the step S2 the destination slices from target or destination PDs based on the RSs associated with the PU candidates. A notification is sent to the logger indicating that there are PUs requiring restriping. To further illustrate, reference is made to the PU0 to be configured from slices of PD0 and PD3 and thus RS1. Option 2 described above is to be implemented that includes a first data movement, where the slice 202b of PD1 (e.g., the source PD) is moved (322) to the target or destination slice 330b on the PD3 (e.g., the target or destination PD). In at least one embodiment, the DMC may allocate the destination slice from the target PD3 for the foregoing first data movement. Reference is made to the PU1 to be configured from slices of PD1 and PD2 and thus RS2. Option 2 described above is to be implemented which includes a second data movement, where the slice 204a of PD1 (e.g., the source PD) is moved (324) to the target or destination slice 332b on the PD2 (e.g., the target or destination PD). In at least one embodiment, the DMC may allocate the destination slice for the foregoing second data movement from the target PD2.

Following the step S2, a step S3 may be performed. In the step S3, for each of the PU candidates, the logger performs an IOCTL, or more generally a system call, to the DMC. In handling this IOCTL, the DMC sets a flag for the PU. The flag may indicate that restriping is in progress for the PU. While this flag for the PU is set indicating that restriping for the PU is in progress, any incoming write to a logical address mapped to the PU is applied to three drive slices associated with the PU. With reference to the element 440a of FIG. 5, the three drive slices of the log associated with the PU include the original pair of mirrored slices (402, 404) of the PU based on the old or existing layout (e.g., as prior to performing the data movement for the PU and prior to restriping the PU) and the target or destination (dst) slice (406) allocated in the step S2. The slice 404 may denote the source slice which is to be copied and moved to the dst slice 406. The slices 402, 404 and 406 are included in the log 422 as stored on the non-volatile PDs of the log tier. At the time when the step S3 is performed, the dst slice 406 contains no valid data as it has just been allocated in the step S2 for use in connection with restriping.

Following the step S3, a step S4 is performed. In the step S4, the logger performs a data flush of the in-memory copy of the PU's data slice to the 3 slices 440a of the log as stored on the non-volatile PDs of the log tier. Thus, the flushing of the single in-memory data slice results in storing the same data in the 3 slices 440a of the log as stored on the non-volatile PDs of the log tier. If no write has occurred to the in-memory copy of the data slice since the restriping of the associated PU was started (where restriping of the PU commenced when the flag associated with the PU was set in the step S3), then the flushing of the step S4 results in flushing the unmodified content of the in-memory data slice to the original mirror slices 402, 404 and also to the dst slice 406. In contrast, if a write has occurred to the in-memory copy of the slice while the restriping of the associated PU is in progress (e.g., before completing the step S5 described below), then all 3 slices 402, 404 and 406 are updated with the in-memory data slice, where the in-memory data slice includes the dirty write data written by the write operation. In both cases, the destination (dst) slice 406 contains same data as the source slice 404. The source slice 404 may be the source of the data movement and the dst slice 406 may be destination of the data movement. For example, with reference to the element 304 of FIG. 4 for the data movement denoted by the arrow 322, the source slice is 330a and the dst slice is 202b. The element 440b of FIG. 5 illustrates the flushing performed in the step S4 where the in-memory copy of the data slice 420 is flushed to the 3 data slices 402, 404 and 406. If there has been a write to a logical address having content stored in the data slice 420 since restriping for the associated PU commenced, the data slice 420 is accordingly updated to include or reference the newly written data. If there has been no such write or modification to the data slice 420 since restriping for the associated PU commenced, then the in-memory copy of the data slice 420 includes the unmodified copy of the data slice.

For a received write that writes data to the logical address, the logical address may be mapped to a PU and offset in the PU, where the PU and offset reference the content or data currently stored at the logical address written to. Since a PU generally includes two mirrored data slices, the logical address may be mapped to an offset within a particular data slice of the PU, where an in-memory copy of the data slice may be maintained and accordingly updated to include or reference the data written. At a later point in time, updates to the in-memory copy or in-memory data slices of the log may be flushed to the log as stored on the non-volatile PDs of the log tier. If the logical address written to has a corresponding record in the PU for which restriping is in-progress (as indicated by the flag set in the step S3), the in-memory copy of the drive slice is updated. At a later point in time, the in-memory copy of drive slice is flushed to the log as stored on the non-volatile PDs of the log tier.

Figure 5:
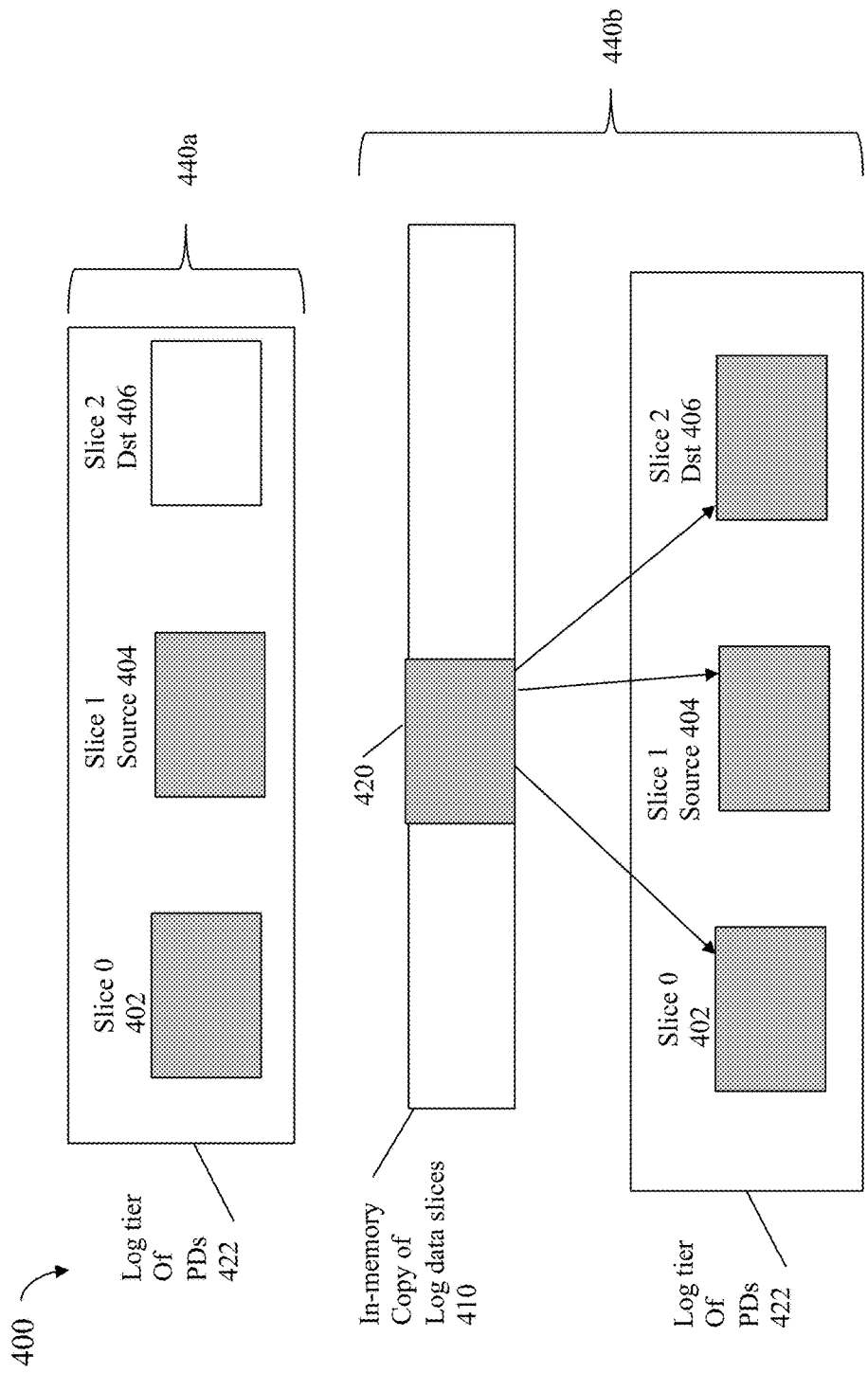
FIG. 5 is an example illustrating processing performed in connection with restriping or re-laying out a PU in which a slice is moved from a source to a destination in an embodiment in accordance with the techniques herein.
Figure 6:
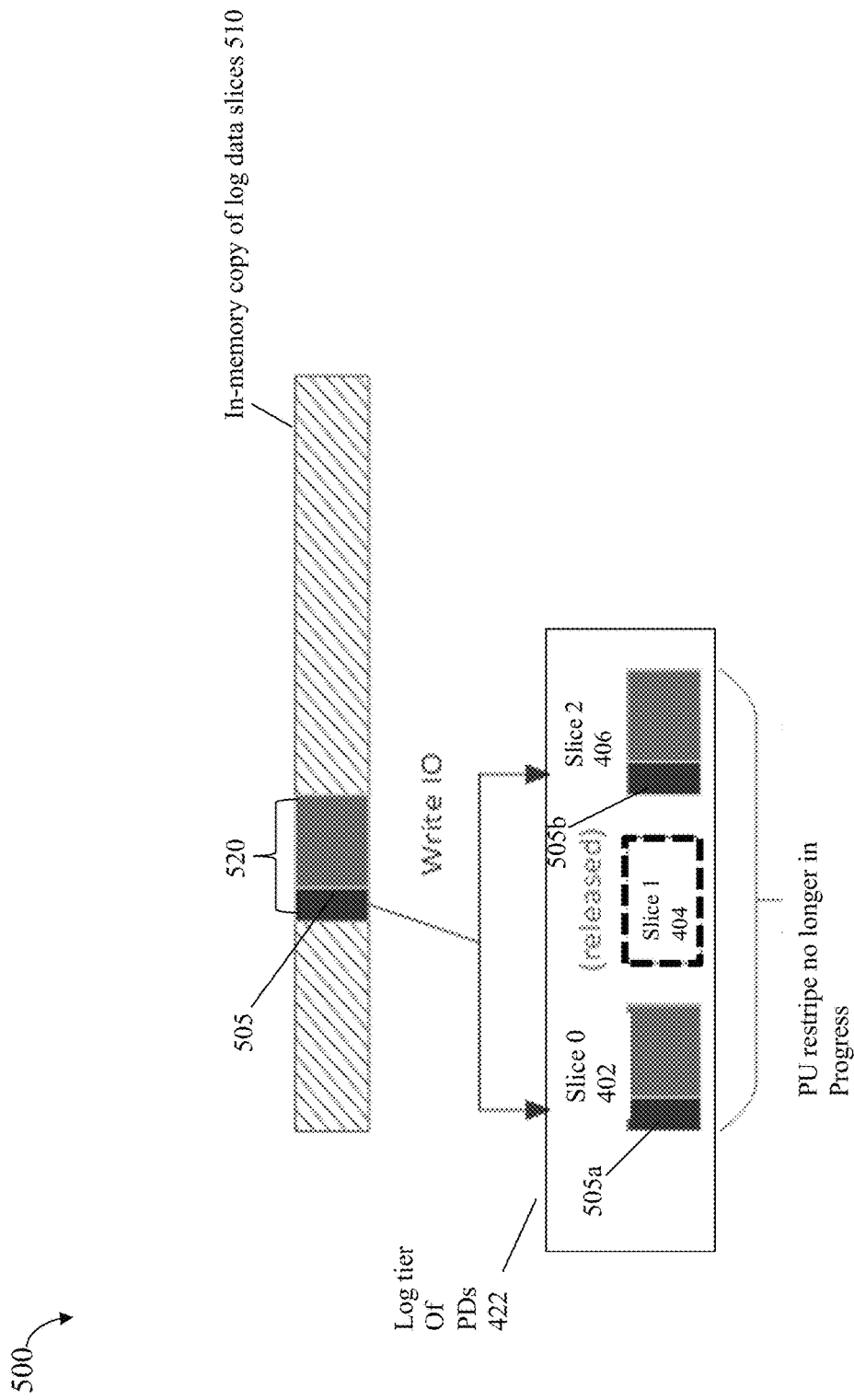
FIG. 6 is an example illustrating processing performed after restriping has completed for a PU where a source slice is released and a write is subsequently applied to the PU in an embodiment in accordance with the techniques herein.

Following the step S4, a step S5 may be performed. In the step S5 with reference to FIG. 6, after the flushing of the step S4 has completed, the logger sends an IOCTL, or more generally a system call, to the DMC. In handling this IOCTL, DMC replaces the source slice 404 of the PU being restriped with the destination slice 406 (e.g., the slice 406 was previously allocated in the step S2 for the PU) by modifying the PU's metadata. Additionally, the step S5 includes releasing the source slice 404 serving as the source of the data movement. The step S5 also includes clearing the flag for the PU previously set in the step S3 processing. Clearing the flag for the PU indicates that restriping for the PU has completed. After the step S5 has completed for the PU, any writes to a logical address mapped to the PU are routed or applied to its updated mirrored slices 402, 406. For example, the element 510 denotes the in-memory copy of the log data slices and the element 520 denotes the in-memory copy of the data slice of the PU. The elements 510, 520 of FIG. 6 respectively correspond to the elements 410, 420 of FIG. 5. The element 505 may denote a portion of the data slice 520 of the PU written to after the step S5 has completed. In this case, the data portion written 505 is subsequently flushed and applied to the two mirrored slices 402, 406 in the log as stored on the PDs of the log tier. The element 505a denotes the data portion 505 written to the slice 0 402; and the element 505b denotes the data portion 505 written to the slice 406.

If there is a drive failure, such as failure of the target or dst PD including the dst slice 406, during the step S5 or more generally while restriping is in progress for the PU, the restriping of the PU may be aborted. In connection with aborting the restriping of the PU, the dst slice 406 may be released and the flag set previously in the step S3 may be cleared. Clearing the flag associated with the PU denotes that striping is no longer in progress for the PU. Written data will not be lost since the source slice 402 is always updated with the latest or most recent data.

Figure 4:
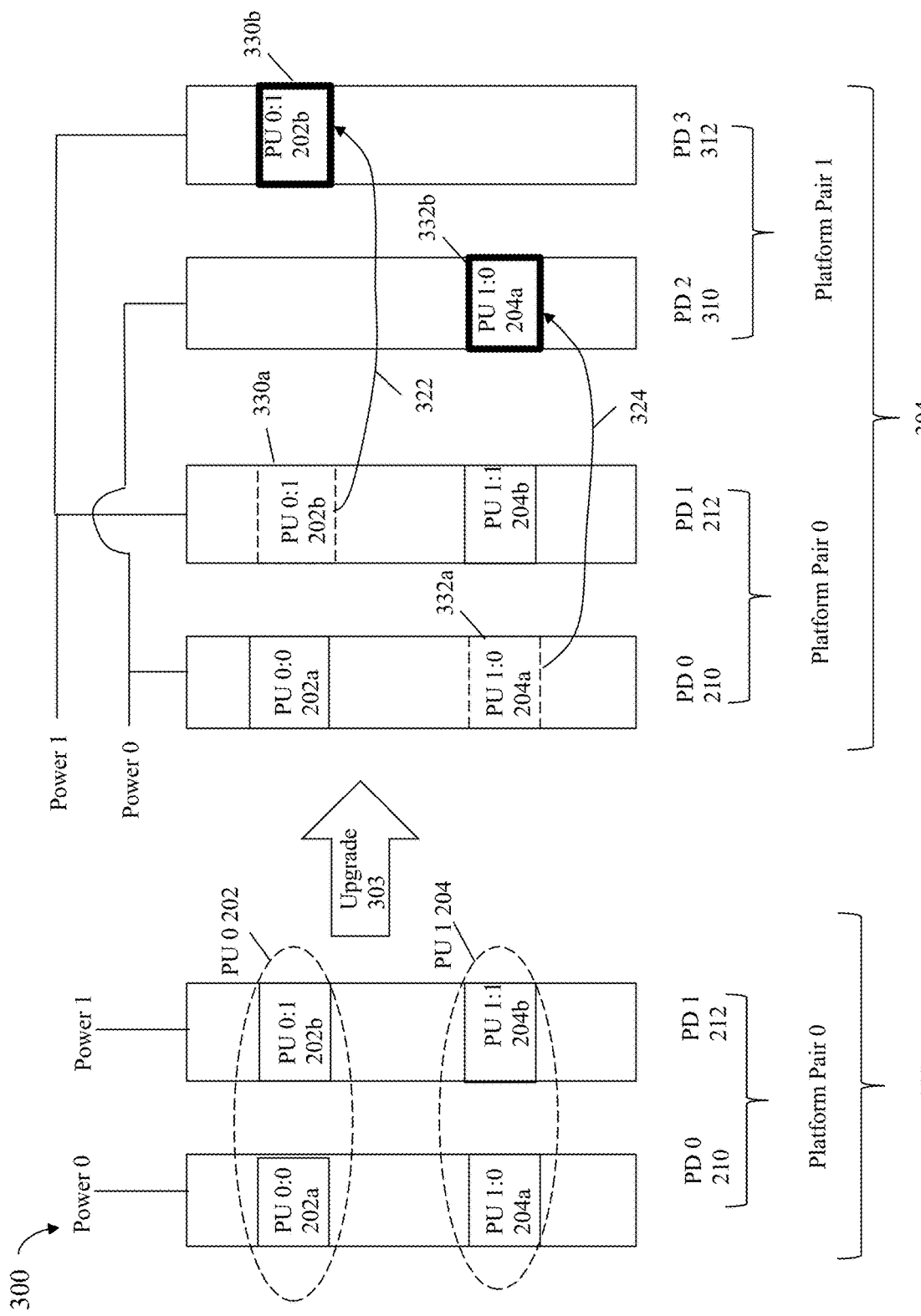

Subsequent to completing the restriping and movement of all necessary slices of PUs, the target layout of the updated configuration 304 of FIG. 4 is achieved. Consistent with other discussion herein, the target layout of the updated configuration 304 meets specified configuration requirements or rules. One configuration requirement or rule is that each PU is configured from slices of two PDs where each of the two PDs use different power supplies. Another configuration rule or requirement is that the PDs in the upgraded configuration are partitioned into one or more logical pairs of PDs where, after redistribution and any necessary data slice movements are completed, each PU includes slices from only a single one of the logical pairs all configured logical pairs. Yet another configuration rule or requirement is that the redistribution of the existing PUs among the PDs of the upgraded configuration 304 distribute the existing PUs as evenly as possible among all the PDs of the upgraded configuration.

Allocation of new PUs from the log tier may take place after the restriping and thus redistribution of the existing PUs has completed. In at least one embodiment, subsequently allocated PUs may be allocated in a round-robin manner so as to evenly distribute the subsequently allocated PUs among the PDs of the log tier. Newly allocated PUs and VUs have a layout respectively similar to the other PUs and VUs in the log tier. Newly allocated PUs are allocated from PDs based on the defined RSs and logical pairs of PDs. Thus, for example, a newly allocated VU may include two PUs forming a stripe, where one of the PUs includes slices allocated based on RS1 and the second of the PUs includes slices allocated based on RS2.

What will now be described is use of the logical pairs in connection with performing log tier restorations in at least one embodiment in accordance with the techniques herein.

Figure 7:
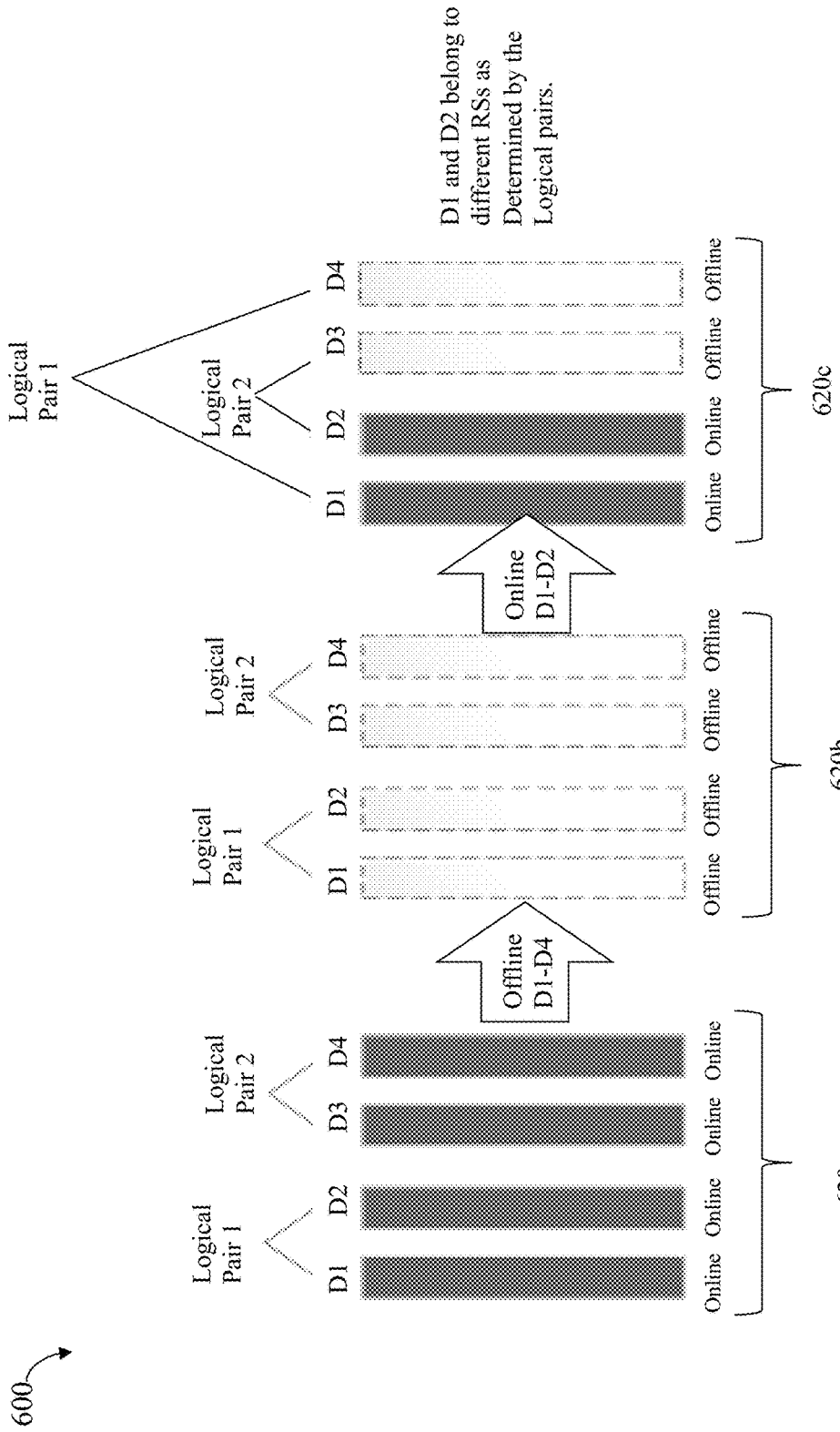
FIGS. 7 and 8 are examples illustrating use of the techniques herein with redefined logical pairs in connection with restoring a log tier.

Referring to FIG. 7, shown is an example 600 illustrating use of logical pairs in connection with performing a log tier restoration in at least one embodiment in accordance with the techniques herein.

The element 620a shows 4 PDs of the log tier at a first point in time T1, where the 4 PDs are denoted as D1-D4. At the time T1, all 4 PDs D1-D4 are online and healthy whereby data may be read from and written to such PDs. The 4 PDs of 620a may be configured into two logical pairs and thus 2 RSs as follows: logical pair 1=(D1, D2); logical pair 2=(D3, D4), where the logical pair 1=RS1 and the logical pair 2=RS2. Each existing PU has its mirrored slices included in one of the RSs or PDs of a single one of the logical pairs of PDs. Metadata associated with each existing PU may identify the RS and thus the logical pair of PDs including the mirrored slices of the PU.

At a second point in time T2 subsequent to T1, all 4 PDs D1-D4 may fail or go offline so that data cannot be read from or written to any of the 4 PDs. The element 620b illustrates the 4 PDs at the time T2. In response to the offline or failure status of all 4 PDs at time T2, a process referred to herein as hault and vault may be performed. Consistent with other discussion herein, a copy of the log data stored on the PDs D1-4 is also stored in memory when the 4 PDs fail or go offline at the time T2. In at least one embodiment, hault and vault processing may include stopping or haulting the system and not processing any I/Os. The hault and vault processing may then include copying the in-memory log data to a "vault" which may be a set of non-volatile PDs. Subsequently, the log data of the vault may be restored to memory and then copied from the memory to PDs of the log tier once such PDs of the log tier are back online.

Subsequent to the time T2, processing may be performed at a time T3 to try and bring the 4 PDs D1-D4 back online. In this particular example as illustrated by the element 620c, assume at the time T3 that only D1 and D2 are brought back online while D3 and D4 remain offline. In at least one embodiment in accordance with the techniques herein, the logical pairs may be redefined as denoted in 620c where the logical pair 1, and thus RS1, is (D1, D4); and where the logical pair 2, and thus RS2, is (D2, D3). More generally, the logical pairs may be redefined to include one of the online drives D1 and D2, and one of the offline drives D3 and D4. The metadata of the PUs may be modified based on the redefined logical pairs. For example, previously at the time T1, RS1=logical pair 1=(D1, D2); and RS2=logical pair 2=(D3, D4). Now at the time T3 based on the redefined logical pairs, RS1=logical pair 1=(D1, D4); and RS2=logical pair 2=(D2, D3). The metadata of the PUs may be updated to denote the reconfiguration of the RSs based on the redefined logical pairs. In this manner, a PU having slices from the PDs of RS1 or logical pair 1 now uses the redefined logical pair 1; and a PU having slices from the PDs of RS2 or logical pair 3 now uses the redefined logical pair 2.

Log tier restoration processing may be performed that includes copying the log data from the vault to a memory of the system, and then copied from the memory to the PDs of the log tier based on the redefined logical pairs and redefined RSs. In this example, PUs restored to the logical pair 1 of 620c may be characterized as degraded since only one copy of the PU data is available on D1 but not D4 since D4 is offline. PUs restored to the logical pair 2 of 620c may be characterized as degraded since only one copy of the PU data is available on D2 but not D3 since D3 is offline. Thus, although all PUs are degraded, the log tier may be used to service I/Os using the slices of the PUs stored on the two online PDs D1 and D2.

It should be noted that other different drive failure scenarios may result in the drive states as illustrated by the element 620c. For example, the element 620c may occur as a result of the drives D3 and D4 going offline without first having all 4 drives D1-D4 go offline as in 620b. In this latter scenario, the drive states may proceed from 620a directly to 620c.

Figure 8:
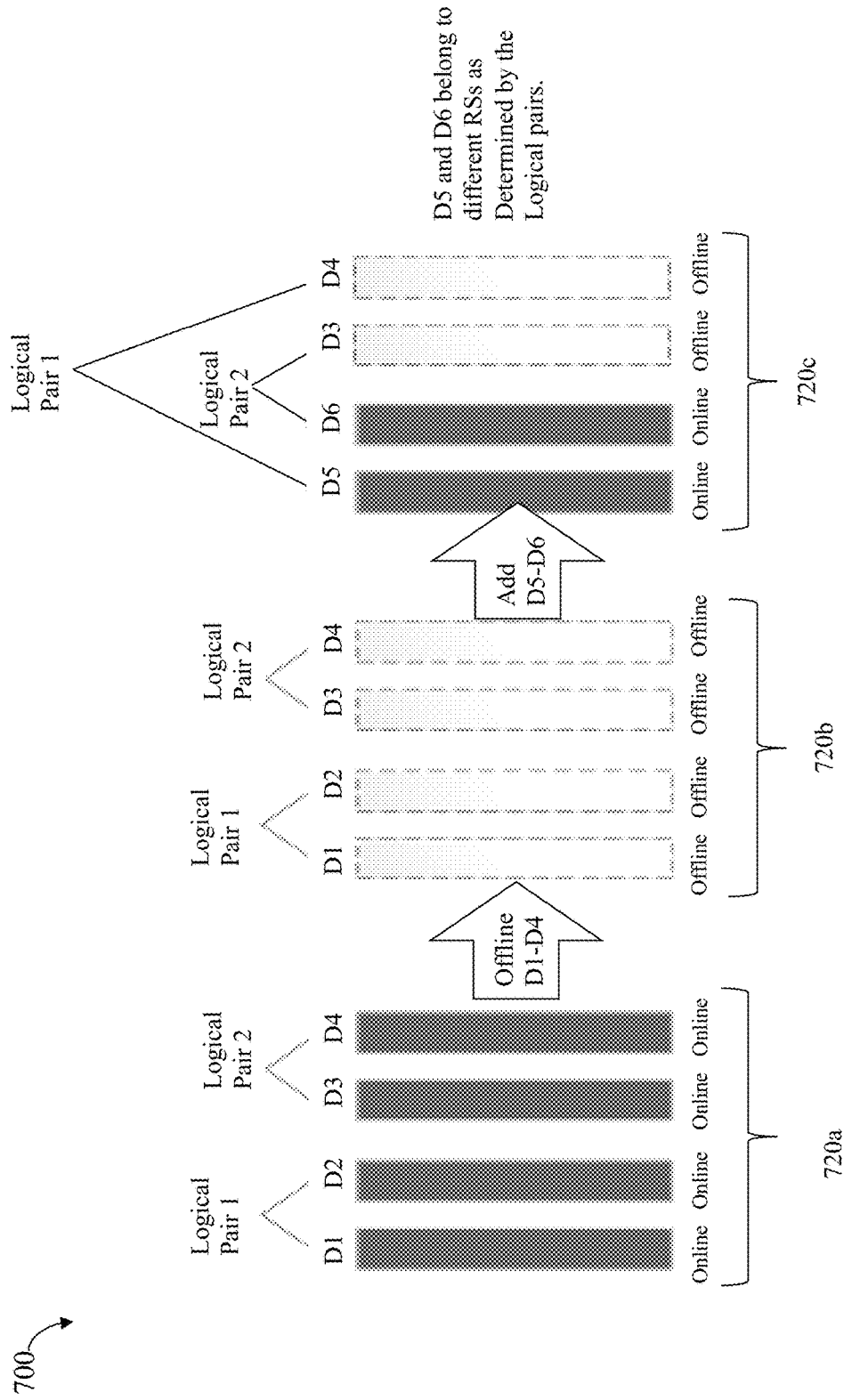

Referring to FIG. 8, shown is an example 700 illustrating another use of logical pairs in connection with performing a log tier restoration in at least one embodiment in accordance with the techniques herein.

The elements 720a and 720b of FIG. 8 are respectively similar to the elements 620a and 620b of FIG. 7. The element 720a shows 4 PDs of the log tier at a first point in time T1, where the 4 PDs are denoted as D1-D4. At the time T1, all 4 PDs D1-D4 are online and healthy whereby data may be read from and written to such PDs. The 4 PDs of 720a may be configured into two logical pairs and thus 2 RSs as follows: logical pair 1=(D1, D2); logical pair 2=(D3, D4), where the logical pair 1=RS1 and the logical pair 2=RS2. Each existing PU has its mirrored slices included in one of the RSs or PDs of a single one of the logical pairs of PDs. Metadata associated with each existing PU may identify the RS and thus the logical pair of PDs including the mirrored slices of the PU.

At a second point in time T2 subsequent to T1, all 4 PDs D1-D4 may fail or go offline so that data cannot be read from or written to any of the 4 PDs. The element 720b illustrates the 4 PDs at the time T2. In response to the offline or failure status of all 4 PDs at time T2, the process referred to herein as hault and vault may be performed. Consistent with other discussion herein, a copy of the log data stored on the PDs D1-4 is also stored in memory when the 4 PDs fail or go offline at the time T2. In at least one embodiment, hault and vault processing may include stopping or haulting the system and not processing any I/Os. The hault and vault processing may then include copying the in-memory log data to a "vault" which may be a set of non-volatile PDs. Subsequently, the log data of the vault may be restored to memory and then copied from the memory to PDs of the log tier once such PDs of the log tier are back online.

Subsequent to the time T2, processing may be performed at a time T3 to try and bring the 4 PDs D1-D4 back online. In this particular example, assume that none of the original f PDs D1-D4 come back online. As a result as illustrated by the element 720c, two new drives D5 and D6 may be added where D5 replaces D1 (e.g., D5 is inserted in the drive slot previously occupied by D1); and D6 replaces D2 (e.g., D6 is inserted in the drive slot previously occupied by D2). In at least one embodiment in accordance with the techniques herein, the logical pairs may be redefined as denoted in 720c where the logical pair 1, and thus RS1, is (D5, D4); and where the logical pair 2, and thus RS2, is (D6, D3). More generally, the logical pairs may be redefined to include one of the new online drives D5 and D6, and one of the offline drives D3 and D4. The metadata of the PUs may be modified based on the redefined logical pairs. For example, previously at the time T1, RS1=logical pair 1=(D1, D2); and RS2=logical pair 2=(D3, D4). Now at the time T3 based on the redefined logical pairs, RS1=logical pair 1=(D5, D4); and RS2=logical pair 2=(D6, D3). The metadata of the PUs may be updated to denote the reconfiguration of the RSs based on the redefined logical pairs. In this manner, a PU having slices from the PDs of RS1 or logical pair 1 now uses the redefined logical pair 1; and a PU having slices from the PDs of RS2 or logical pair 3 now uses the redefined logical pair 2.

Log tier restoration processing may be performed that includes copying the log data from the vault to a memory of the system, and then copied from the memory to the PDs of the log tier based on the redefined logical pairs and redefined RSs. In this example, PUs restored to the logical pair 1 of 720c may be characterized as degraded since only one copy of the PU data is available on D5 but not D4 since D4 is offline. PUs restored to the logical pair 2 of 720c may be characterized as degraded since only one copy of the PU data is available on D6 but not D3 since D3 is offline. Thus, although all PUs are degraded, the log tier may be used to service I/Os using the slices of the PUs stored on the two online PDs D5 and D6.

The techniques described herein provide an approach to expand the number of PDs in the log tier, such as from 2 PDs to 4 PDs, and re-layout all existing PUs. The techniques herein use logical pairs of PDs that may be reconfigured and updated to facilitate performing online data in place upgrades to the log tier. The techniques described herein provide for efficiently re-laying out and restriping multiple PUs across an expanded set of PDs. The existing PUs may be distributed across the expanded set of PDs in balanced manner based on space utilization. Additionally, subsequently allocated PUs may also be distributed among the expanded set of PDs in a balanced manner among all PDs of the log tier. In connection with log tier restoration, the logical pairs may be redefined. For example, when bringing PDs of the log tier back online, if one of the logical pairs includes no online PDs and a second of the logical pairs includes two online PDs, the logical pairs may be redefined so that each of the two logical pairs includes a single online PD and a single offline PD. Using the redefined logical pairs, the log tier may be restored and used to service I/Os.

Figure 9:
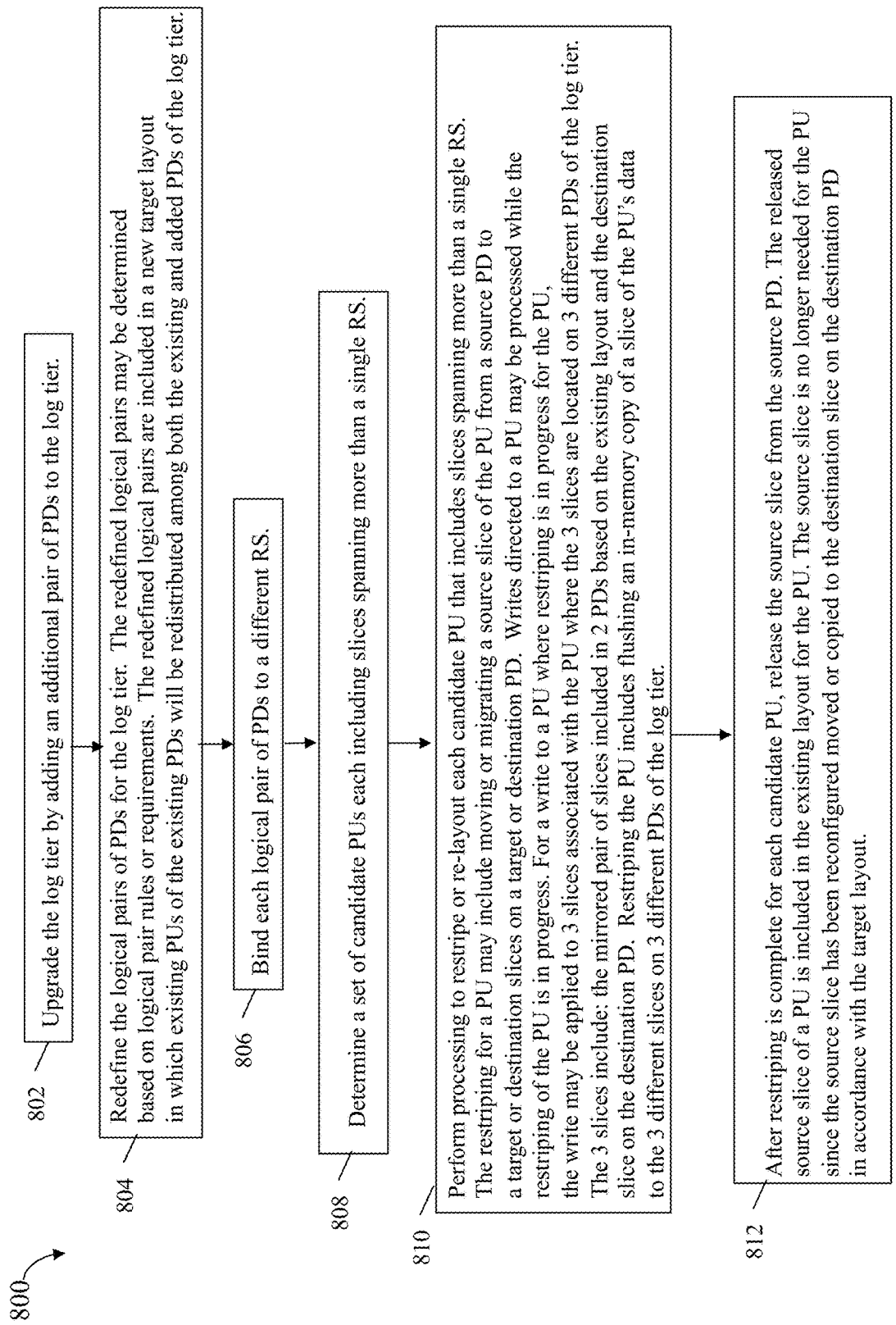
FIG. 9 is a flowchart of processing steps that may be performed in an embodiment in accordance with the techniques herein.

Referring to FIG. 9, shown is a flowchart 800 of processing steps that may be performed in an embodiment in accordance with the techniques herein. The steps of FIG. 9 summarize processing described above.

At a step 802, the log tier of PDs used to store the log may be upgraded by adding an additional pair of PDs. More generally, one or more new pairs of PDs may be added depending on the particular limit regarding the maximum number of PDs allowable in the log tier. From the step 802, control proceeds to a step 804. The step 804 begins processing performed in response to adding the PDs to the log tier in the step 802.

At the step 804, processing may be performed to redefine the logical pairs of PDs for the log tier. The redefined logical pairs may be determined based on logical pair rules or requirements. The redefined logical pairs are included in a new target layout in which existing PUs of the existing PDs will be redistributed among both the existing and added PDs of the log tier. From the step 804, control proceeds to a step 806.

At the step 806, each logical pair of PDs is bound to a different RS. From the step 806, control proceeds to a step 808.

At the step 808, processing is performed to determine a set of candidate PUs where each candidate PU includes slices spanning more than a single RS. From the step 808, control proceeds to a step 810.

At the step 810, processing is performed to restripe or re-layout each candidate PU that includes slices spanning more than a single RS. The restriping for a PU may include moving or migrating a source slice of the PU from a source PD to a target or destination slices on a target or destination PD. Writes directed to a PU may be processed while the restriping of the PU is in progress. For a write to a PU where restriping is in progress for the PU, the write may be applied to 3 slices associated with the PU where the 3 slices are located on 3 different PDs of the log tier. The 3 slices include: the mirrored pair of slices included in 2 PDs based on the existing layout and the destination slice on the destination PD. Restriping the PU includes flushing an in-memory copy of a slice of the PU's data to the 3 different slices on 3 different PDs of the log tier. From the step 810, control proceeds to the step 812.

At the step 812, after restriping for each candidate PU is complete, the source slice associated with the PU may be released. The source slice is no longer needed for the PU since the source slice has been reconfigured, moved or copied to the destination slice on the destination PD in accordance with the target layout.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of storage management comprising:
adding a first plurality of storage devices to a pool, wherein prior to adding the first plurality of storage devices to the pool, said pool includes a second plurality of storage devices with a plurality of existing physical storage units (PUs) distributed across the second plurality of storage devices; and
in response to said adding the first plurality of storage devices to the pool, performing first processing to evenly distribute the plurality of existing PUs among the pool of storage devices, said first processing including:
defining a plurality of logical pairs of storage devices in accordance with rules;
binding each of the plurality of logical pairs to one of a plurality of resiliency sets;
determining that a first PU of the plurality of existing PUs includes disk slices that span across more than a single one of the plurality of resiliency sets; and
in response to determining that the first PU includes disk slices that span across more than a single one of the plurality of resiliency sets, performing second processing to restripe the first PU in accordance with a target layout.

2. The method of claim 1, wherein each of the plurality of existing PUs includes a first disk slice and a second disk slice that mirrors data of the first disk slice, wherein the first disk slice is included in a first storage device of the second plurality of storage devices and wherein the second disk slice is included in a second storage device of the second plurality of storage devices.

3. The method of claim 1, wherein said second processing to restripe the first PU includes moving a source slice of the first PU from a source storage device of the first plurality of storage devices of the pool to a destination slice of a destination storage device of the pool.

4. The method of claim 3, wherein after performing the second processing, the first PU includes disk slices that are included in only a single one of the plurality of resiliency sets.

5. The method of claim 1, wherein each logical pair of the plurality of logical pairs includes two storage devices of the pool.

6. The method of claim 5, wherein a first rule of the plurality of rules specifies that a first of the two storage devices of said each logical pair has a different power supply than a second of the two storage device of said each logical pair.

7. The method of claim 6, wherein a second rules of the plurality of rules specifies that in the target layout, the plurality of existing PUs is evenly distributed across the plurality of logical pairs of storage devices.

8. The method of claim 7, wherein each storage device of the pool is included in one of the plurality of logical pairs of storage devices.

9. The method of claim 3, wherein a write operation that writes first data to the first PU is received and serviced while performing said second processing to restripe the first PU.

10. The method of claim 9, wherein the first PU includes a first disk slice of a first storage device of the pool and includes a second disk slice of a second storage device of the pool, wherein data of the first disk slice mirrors the second disk slice, wherein the source storage device is the second storage device, wherein the source slice is the second disk slice, and wherein a first data slice is stored on the first disk slice and the second disk slice.

11. The method of claim 10, performing third processing to service the write operation while also performing the second processing to restripe the first PU, wherein the third processing includes:
updating an in-memory copy of the first data slice to include the first data written by the write operation; and
flushing the in-memory copy of the first data slice to the first disk slice of the first storage device, the second disk slice of the second storage device and the destination slice of the destination storage device.

12. The method of claim 11, wherein the second processing to restripe the first PU has completed and the method includes:
releasing the source slice, which is the second disk slice, for reuse; and
updating metadata of the first PU to indicate that the first PU includes the first disk slice of the first storage device and the destination slice of the destination storage device.

13. The method of claim 12, wherein a second write operation that writes second data to the first PU is received after the second processing has completed, and the method includes:
updating the in-memory copy of the first data slice to include the second data written by the second write operation; and
flushing the in-memory copy of the first data slice to the first disk slice of the first storage device and the destination slice of the destination storage device.

14. The method of claim 1, wherein two storage devices of the pool go offline and wherein the two storage devices are included in the same one logical pair of the plurality of logical pairs.

15. The method of claim 14, further comprising:
redefining the plurality of logical pairs so that each of the plurality of logical pairs includes at least one storage device of the plurality of storage devices that is online and wherein the same one logical pair is redefined to include at least one storage device of the plurality of storage devices that is online; and
performing restoration processing to restore data to the redefined plurality of logical pairs.

16. A system comprising:
one or more processors; and
a memory comprising code stored thereon that, when executed, performs a method of storage management comprising:
adding a first plurality of storage devices to a pool, wherein prior to adding the first plurality of storage devices to the pool, said pool includes a second plurality of storage devices with a plurality of existing physical storage units (PUs) distributed across the second plurality of storage devices; and
in response to said adding the first plurality of storage devices to the pool, performing first processing to evenly distribute the plurality of existing PUs among the pool of storage devices, said first processing including:
defining a plurality of logical pairs of storage devices in accordance with rules;
binding each of the plurality of logical pairs to one of a plurality of resiliency sets;

determining that a first PU of the plurality of existing PUs includes disk slices that span across more than a single one of the plurality of resiliency sets; and in response to determining that the first PU includes disk slices that span across more than a single one of the plurality of resiliency sets, performing second processing to restripe the first PU in accordance with a target layout.

17. A non-transitory computer readable memory comprising code stored thereon that, when executed, performs a method of storage management comprising:

adding a first plurality of storage devices to a pool, wherein prior to adding the first plurality of storage devices to the pool, said pool includes a second plurality of storage devices with a plurality of existing physical storage units (PUs) distributed across the second plurality of storage devices; and in response to said adding the first plurality of storage devices to the pool, performing first processing to evenly distribute the plurality of existing PUs among the pool of storage devices, said first processing including:

defining a plurality of logical pairs of storage devices in accordance with rules;

binding each of the plurality of logical pairs to one of a plurality of resiliency sets;

determining that a first PU of the plurality of existing PUs includes disk slices that span across more than a single one of the plurality of resiliency sets; and in response to determining that the first PU includes disk slices that span across more than a single one of the plurality of resiliency sets, performing second processing to restripe the first PU in accordance with a target layout.

18. The non-transitory computer readable memory of claim 17, wherein each of the plurality of existing PUs includes a first disk slice and a second disk slice that mirrors data of the first disk slice, wherein the first disk slice is included in a first storage device of the second plurality of storage devices and wherein the second disk slice is included in a second storage device of the second plurality of storage devices.

19. The non-transitory computer readable memory of claim 17, wherein said second processing to restripe the first PU includes moving a source slice of the first PU from a source storage device of the first plurality of storage devices of the pool to a destination slice of a destination storage device of the pool.

20. The non-transitory computer readable memory of claim 19, wherein after performing the second processing, the first PU includes disk slices that are included in only a single one of the plurality of resiliency sets.

* * * * *